United States Patent
Moskovits et al.

(10) Patent No.: US 6,515,274 B1
(45) Date of Patent: Feb. 4, 2003

(54) NEAR-FIELD SCANNING OPTICAL MICROSCOPE WITH A HIGH Q-FACTOR PIEZOELECTRIC SENSING ELEMENT

(76) Inventors: Martin Moskovits, 145 Chiltern Hill Road, Toronto, Ontario (CA), M6C 3C3; Konstantin B. Shelimov, 69 Clairton Crescent, Toronto, Ontario (CA), M6N 2M7; Dmitri N. Davydov, 17 Angus Drive, Toronto, Ontario (CA), K2l 4E6; Thomas L. Haslett, 9 Redwood Avenue, Toronto, Ontario (CA), M4L 2S5

( * ) Notice: Subject to any disclaimer, the term of this patent is extended or adjusted under 35 U.S.C. 154(b) by 99 days.

(21) Appl. No.: 09/620,588

(22) Filed: Jul. 20, 2000

Related U.S. Application Data

(60) Provisional application No. 60/144,627, filed on Jul. 20, 1999.

(51) Int. Cl.[7] .............................................. G02B 21/00
(52) U.S. Cl. ...................... 250/216; 250/234; 250/306; 73/105
(58) Field of Search ................................ 250/234, 216, 250/306, 307; 73/105, 579

(56) References Cited

U.S. PATENT DOCUMENTS

| | | |
|---|---|---|
| 5,212,987 A | 5/1993 | Dransfeld et al. |
| 5,394,500 A | 2/1995 | Marchman |

(List continued on next page.)

FOREIGN PATENT DOCUMENTS

| | | |
|---|---|---|
| DE | 19531465 | 2/1996 |
| EP | 791802 | 8/1997 |
| EP | 8010318 | 10/1997 |

OTHER PUBLICATIONS

Tsai et al.: "Tapping–mode Tuning Fork Force Sensing for Near–field Scanning Optical Microscopy", Applied Physics Letters, vol. 73, No. 19, p. 2724 (1998).
Pangaribuan et al.: "Highly Controllable Fabrication of Fiber Probe for Photon Scanning Tunneling Microscope", Scanning, vol. 16, pp. 362–367 (1994).
Muramatsu et al.: "A Self–Sensitive Probe Composed of a Piezoelectric Tuning Fork and a Bent Optical Fiber Tip for Scanning Near–field Optical/Atomic Force Microscopy", Applied Physics Letters, vol. 36, Pt. 1, No. 9A, pp. 5753–5758 (1997).
Pangaribuan et al.: "Reproducible Fabrication Technique of Nanometric Tip Diameter Fiber Probe for Photon Scanning Tunneling Microscope", Applied Physics Letters, vol. 31, Pt. 2, No. 9A, pp. 1302–1304 (1992).

*Primary Examiner*—Kevin Pyo
(74) *Attorney, Agent, or Firm*—Lynn G. Schmacher; Ralph A. Dowell

(57) ABSTRACT

A perpendicular-mode near-field scanning optical microscope (NSOM) utilizing a piezoelectric micro tuning fork as its height-sensing element is described. The present invention provides a method and apparatus for modifying and attaching an optical fiber to the tuning fork that allows the assembly to retain Q-factors up to 9000, substantially higher than those described so far in the literature for tuning-fork-based instruments. The method involves reducing the diameter of the cladding of the optical fiber down to the 17–25 $\mu$m using several chemical etching steps, before the fiber is attached to the tuning fork. A sharp upturn in the Q-factor is observed when the fiber diameter d drops below ~25 $\mu$m. An analysis, which shows that the stretching force constant of a bent fiber is proportional to $d^4$, is used to account for the great sensitivity of the Q-factor to the fiber diameter. The high Q-factors resulted in improved force sensitivity and allowed us to construct a perpendicular mode instrument without the use of additional dithering piezoelements. An improved NSOM operating in the sear force mode is also provided by thinning the optical fiber length running down the length of one of the tines to a thickness in the range from about 50 to 60 $\mu$m.

14 Claims, 13 Drawing Sheets

U.S. PATENT DOCUMENTS

| | | |
|---|---|---|
| 5,395,741 A | 3/1995 | Marchman |
| 5,412,980 A | 5/1995 | Elings et al. |
| 5,485,536 A | 1/1996 | Islam |
| 5,519,212 A | 5/1996 | Elings et al. |
| 5,641,896 A | 6/1997 | Karrai |
| 5,664,036 A | 9/1997 | Islam |
| 5,821,409 A | 10/1998 | Honma et al. |
| 5,859,364 A | 1/1999 | Toda et al. |
| 5,886,532 A | 3/1999 | Hsu et al. |
| 6,194,711 B1 * | 2/2001 | Tomita ........................ 250/234 |

* cited by examiner

NEAR-FIELD SCANNING OPTICAL MICROSCOPE WITH A HIGH Q-FACTOR PIEZOELECTRIC SENSING ELEMENT

CROSS REFERENCE TO RELATED U.S. PATENT APPLICATION

This patent application relates to United States Provisional Patent Application Ser. No. 60/144,627 filed on Jul. 20, 1999, entitled NEAR-FIELD SCANNING OPTICAL MICROSCOPE WITH HIGH Q-FACTOR PIEZOELECTRIC SENSING ELEMENT.

FIELD OF THE INVENTION

The present invention relates to near-field scanning optical microscopes using high Q-factor piezoelectric sensing elements.

BACKGROUND OF THE INVENTION

Near-field scanning optical microscopy is capable of producing optical images with resolutions surpassing the half-wavelength limit of conventional far-field microscopy. The probe of a near-field scanning optical microscope (NSOM) is a small aperture, usually the tip of a sharpened optical fiber, scanned in close proximity to the sample's surface. The aperture serves as either a light-source illuminating the sample, or as an aperture collecting light emitted or scattered from the sample. In order to achieve subwavelength resolution, the aperture-sample distance must be scrupulously controlled by an appropriate feed-back strategy. Height control is most frequently accomplished optically; that is, the fiber tip is caused to vibrate at one of its resonant frequencies. A laser beam is focussed onto the fiber, and the height-dependent transverse vibrational amplitude of the tip is measured using, for example, a photodiode.[1] The amplitude is then used as the feedback parameter used to maintain the tip at approximately a fixed distance above the surface. An alternative control scheme, introduced recently by Karrai and Grober[2], utilizes a quartz micro-tuning fork as the height-sensing element. As the tip of the optical fiber (which is attached to the tuning fork) approaches the sample surface, the amplitude, phase and frequency of the tuning fork's vibrational normal modes change. Any one of these parameters can then be used as the feedback signal for tip-sample distance control. In the design of ref. 2 the tuning fork was used strictly as a sensing element; an additional piezo element was used to dither the optical fiber/tuning fork assembly parallel to the sample surface. Another strategy, introduced by Atia and Davis[3], makes use of the tuning fork as both the dithering and the sensing element. Piezoelectric tip-sample distance regulation yields a number of advantages over optical control including simplicity, compactness, less drift in the feedback loop and lower levels of parasitic optical background.

Since the original publication, a number of NSOMs utilizing piezoelectric height control have been described.[4,5,6,7,8,9,10] Most operate in the so-called "shear-force mode". In this configuration, an optical fiber is attached along the edge of one of the tuning fork's tines, and the tuning fork is oriented such that the tip vibrates parallel to the sample surface. In an alternative orientation the fiber tip vibrates approximately along the normal to the sample surface but without making contact with the sample surface. (We will refer to this mode of tip motion as a perpendicular mode of operation.) In this mode of operation the tip senses higher force gradients resulting in more reliable tip-sample distance control. To the best of our knowledge, only two NSOM instruments with piezoelectric sensing elements in which the tip vibrates along the normal to the surface have been described so far. Muramatsu et al.[7] describes an instrument in which the perpendicular mode of operation is achieved by bending the tip of the optical fiber glued along the edge of a tine by approximately 90°. Tsai and Lu[10] attached an optical fiber across a tine and used a piezoelectric bimorph to dither the tuning fork/fiber assembly normal to the sample surface. However, the quality factors of the tuning fork/optical fiber assemblies described by both groups were substantially lower than the Q-factors normally reported for shear force instruments. Hence, the perpendicular mode of operation in both of these instruments was achieved at a cost in the overall instrumental performance from those achieved in the shear mode configuration. In addition, bending the optical fiber in [7] potentially results in optical losses.

The magnitude of the Q-factor of the tuning fork/optical fiber assembly is a central factor influencing the performance of a near-field microscope with piezoelectric sensing elements. Commercially available quartz micro tuning forks have very high Q-factors, ranging from 50,000 to 200,000 in vacuum and 10,000 to 20,000 in air. Attaching an optical fiber to one of the tines of a tuning fork causes a large reduction in Q-factor. For NSOMs operating in the shear force mode, Q-factors of 1,000 to 3,000 have been reported. By contrast the Q-factors of instruments operating in the perpendicular mode described in the literature so far did not exceed several hundred. The minimum force (or force gradient) detectable by an instrument is proportional to $Q^{-1/2}$; hence a large Q is crucial if high sensitivity increase is to be achieved.[11] Hence, in the instruments described so far, the potential gain in instrument sensitivity normally achieved by operating the NSOM in the perpendicular mode was significantly offset by their lower Q-factors. Moreover, because stable self-sustained oscillations are difficult to achieve with low-Q-factor piezoelements, additional dithering elements had to be used to cause the tuning fork/optical fiber system to vibrate thereby complicating the device and introducing an additional source of drift in the feedback signal.

SUMMARY OF THE INVENTION

It is an object of the present invention to provide a optical fiber/tuning fork sensor assembly for use in a near field optical microscope having a Q-factor superior to currently available sensor assemblies In one aspect of the invention there is provided a piezoelectric sensing element for use in a near-field scanning optical microscope, comprising:

a micro tuning fork mounted in a holder, the micro tuning fork including first and second tines and the holder having a piezoelectric element for dithering the micro tuning fork; and an optical fiber being connectable to a photodetection means and having a thinned end portion having a diameter less than a threshold thickness, the thinned portion of the optical fiber being attached to said first tine with said first tine being adapted to be adjacent to a surface being scanned in operation.

In another aspect of the invention there is provided a piezoelectric sensing element for use in a near-field scanning optical microscope, comprising:

a micro tuning fork mounted in a holder, the micro tuning fork including first and second tines and the holder having a piezoelectric element for dithering the micro tuning fork; and an optical fiber being connectable to a photodetection means and a thinned end portion having a diameter less than a threshold thickness, the thinned portion of the optical fiber being attached at a first position thereof to the holder and being attached at a second position thereof spaced from an end of the optical fiber to a first tine at a position spaced from an end of the first tine, the optical fiber extending transversly across the tines of the micro tuning fork, said first tine being adapted to be adjacent to a surface being scanned in operation.

In another aspect of the invention there is provided a A piezoelectric sensing element for use in a near-field scanning optical microscope, comprising:

a micro tuning fork mounted in a holder for operation in a shear mode, the micro tuning fork including a pair of tines and the holder having a piezoelectric element attachable thereto for dithering the micro tuning fork; and an optical fiber having an end portion connectable to a photodetection means and a thinned end portion having a diameter in a range of about 40–80 µm, the thinned portion of the optical fiber being attached along a length of one of said tines.

BRIEF DESCRIPTION OF THE DRAWINGS

The present invention will now be described, by way of example only, reference being had to the accompanying drawings, in which.

DETAILED DESCRIPTION OF THE INVENTION

In the present application the inventors present a theoretical analysis of the dynamics of an optical fiber/tuning fork assembly together with experimental verification of these results. The goal is to analyze the principal causes of the Q-factor deterioration and suggest possible ways to overcome them. The present analysis is primarily applicable to the perpendicular mode configuration, where the problem of low Q-factors has proved to be particularly serious. The impact on the Q-factor of such parameters as the diameter of the optical fiber, the degree of its bending, the location of its points of attachment to the tuning fork, and the transverse vibrational normal modes of the fiber tip, which depend on its length were considered. Based on the results of the analysis, the inventors have been able to provide a perpendicular mode NSOM with Q-factors of the optical fiber/tuning fork assembly up to 9,000, far exceeding those reported in the literature so far.[12]

Commercially available quartz micro tuning fork crystals (Raltron, R38) with resonance frequency of 32,768 Hz and Q-factors of ~15,000 in air were used in the present studies. The dimensions of the tuning fork tines were 3.5×0.6×0.25 mm. Optical fibers (Newport Corp., F-SV) were used with 4 µm core, and 125 µm cladding diameter. The cladding diameter can be reduced substantially by etching in 49% hydrofluoric acid at room temperature without degrading the optical guiding properties of the fiber. In a typical fiber preparation procedure, the cladding of an optical fiber was etched down to about 60 µm over a length of approximately 1 cm. A sharp tip was then formed by drawing the fiber while heating its thinned portion in the plasma discharge of a commercial fiber splicer. A protective layer of polymethylmethacrylate was deposited on the fiber tip (out of an acetone solution). The thinned portion of the fiber was then further etched down to the desired diameter (usually 17–25 µm). The protective layer was then removed with acetone. Optionally, the fiber tip could be sharpened by further etching in 49% hydrofluoric acid for approximately 30 seconds.

Figure 1:
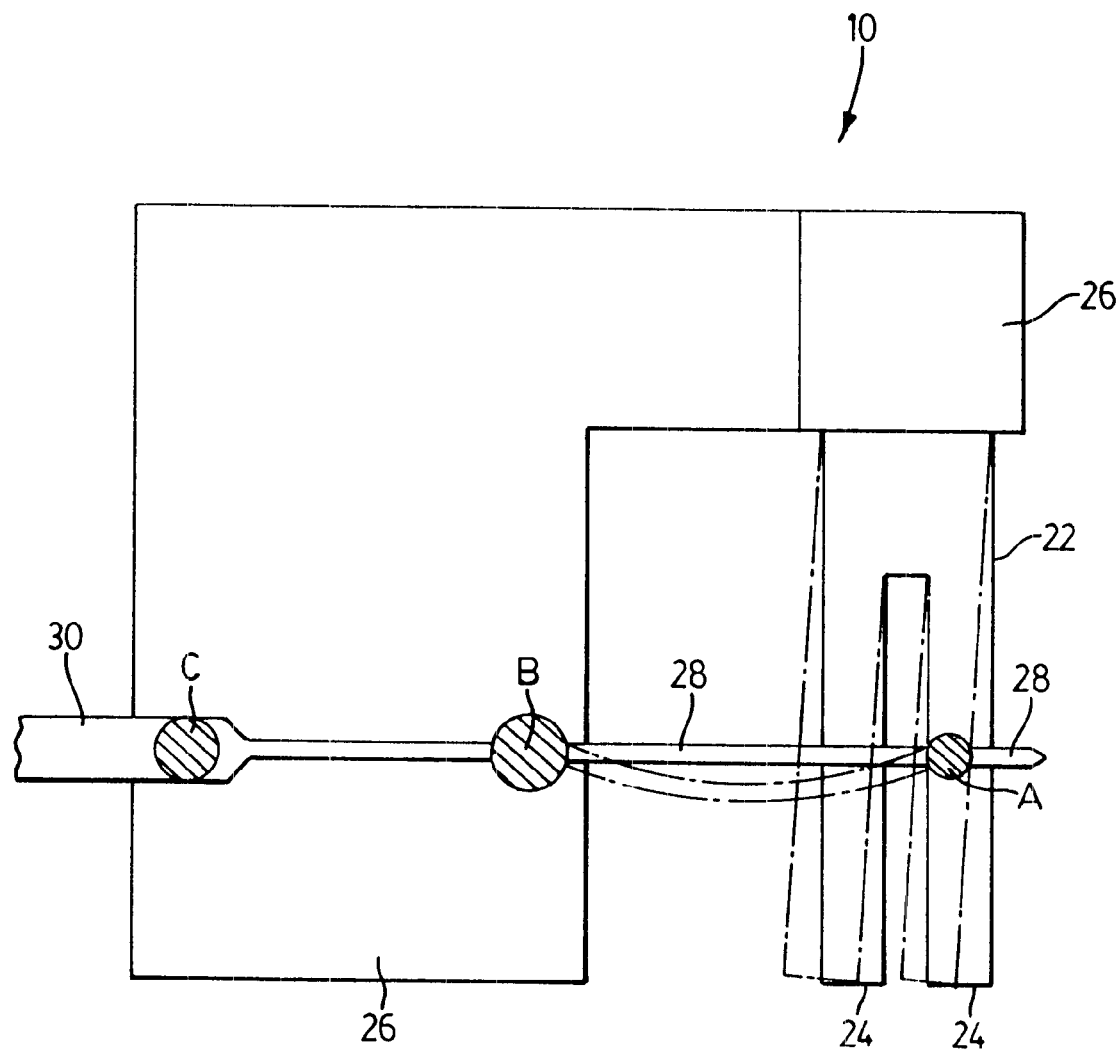
FIG. 1. A detailed view of a micro tuning fork, tuning fork holder and a thinned optical fiber assembled in accordance with the present invention.

In order to operate the NSOM in the perpendicular mode configuration (the configuration in which the fiber tip vibrates approximately along the normal to the sample surface as it scans), the tuning forks were mounted in a specially designed titanium holder shown generally at 10 in FIG. 1. A quartz tuning fork/optical fiber assembly used for the Q-factor measurements in the perpendicular mode configuration includes tuning fork 22 having tines 24 mounted in holder 26. The end section 28 of an optical fiber 30 was reduced by etching to about 20 $\mu$m. The assembly is mounted in the specially designed titanium holder 26. The fiber 28 is attached to one of the tines 24 of the fork 22 at point A and to the holder 26 at points B and C. This attachment isolates the portion of the fiber 28 below point B from the rest of the fiber, so that only this portion of the fiber influences the dynamical properties of the assembly.

Fibers were epoxy-glued to the lower tine of the tuning fork after it was mounted in its holder (point A in FIGS. 1 and 3) and, to two locations on tuning fork holder (points B and C). The distance between points A and B is approximately 3 $\mu$m. The dynamical properties of the tuning fork/optical fiber assembly are determined only by the portion of the fiber 28 below the point of attachment to the holder (point B in FIGS. 1 and 3). The rest of the fiber 30 can be made as long as desired with no noticeable effect on the Q-factor of the assembly. In assessing the operation of these assemblies in the shear-force configuration, un-etched 125 $\mu$m fibers wee glued along the edge of one of the tines of the fork. Likewise, we investigated the behavior of the tuning-fork sensors when loaded with a thin element with a density and elastic properties very different from those of quad. For example, tips were made from a 50 $\mu$m diameter tungsten wire of a varying length. Of course, under such circumstances the assembly would used as an AFM rather than as an NSOM.

Our ultimate goal was to adapt the NSOM design described by Atia and Davis[3] to a perpendicular mode configuration. In this configuration, the tuning fork which serves as the frequency-determining element of the circuit is connected in a positive feedback loop. The resonance frequency of the tuning fork/optical fiber assembly changes as the fiber tip approaches the sample surface. The frequency change is tracked with a phase detector[13], and the signal from the phase detector is fed to the electronics controlling the position of the tuning fork above the sample surface through a z-piezo. The scanning of the fiber tip at a fixed height above the sample surface is achieved by forming a phase-locked loop, with the tuning fork being the frequency-setting element and the z-piezo electronics serving as a voltage-controlled oscillator. In order to achieve stability the piezo element must have a sufficiently narrow bandwidth. A bandwidth of 15 Hz or lower, corresponding to a Q-factor of 2000 or higher is found to confer sufficient stability to our assemblies. Ideally, one should attempt is to acheive conditions corresponding to even higher Q-factors for even greater stability.

I. The Effect of Tine Asymmetry on the Q-factor

Figure 2:
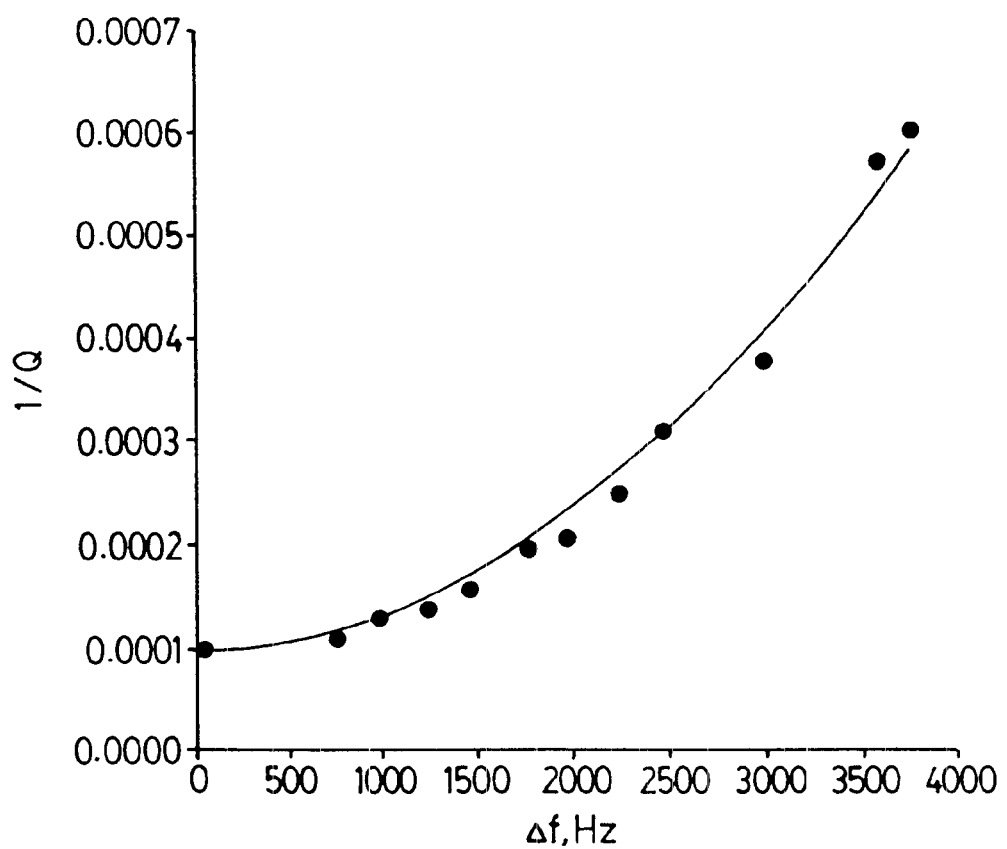
FIG. 2. The inverse Q-factor of a mass-loaded quartz tuning fork plotted as a function of the mismatch between the resonance frequencies of the fork's tines. The tip of one of the tines was loaded with a drop of polymethylmethacrylate of a varied size (from an acetone solution). The tine frequency mismatch is assumed to be twice the shift of the resonance frequency of the fork upon loading. The line is the fit to the data of the form $1/Q=1/Q_0+\alpha\Delta f^2$, where $\alpha$ is an adjustable parameter.

The high Q-factor of a tuning-fork resonator is critically dependent on the symmetry and equivalence of the tines. For strictly equivalent tines the principal antisymmetric vibrational mode of the fork does not involve any motion of the tuning-fork's base in the direction parallel to the tines' motion, minimizing, thereby, the energy dissipation due to vibrational excitation of the base. Changing the mass or stiffness of one of the tines in comparison with the other due, for example, to the attachment of an NSOM or AFM probe, breaks the symmetry, thereby exciting base motion. This is one of the main causes of Q-factor deterioration. The degree of asymmetry can be characterized by the mismatch, $\Delta f$, between the resonance frequencies of the fork's tines. FIG. 2 shows the dependence of the Q-factor on $\Delta f$ for a tuning fork with one of the tines loaded with a droplet of polymethylmethacrylate of varying mass. $\Delta f$ was defined as twice the shift of the resonance frequency of the fork upon loading. (This is strictly true only if the shape of the resonance curve is unchanged upon loading and the coupling between the tines is symmetric.) Q is found to depend on $\Delta f$ approximately as:

$$\frac{1}{Q} = \frac{1}{Q_0} + \alpha \Delta f^2, \qquad (1)$$

where $Q_0$ is the Q-factor of the unperturbed tuning fork. The quadratic dependence of Q on $\Delta f$ is expected when the main energy dissipation mechanism is the induced motion of the fork's base.[14] However, a quadratic dependence was also observed for many other types of tuning fork perturbations. Accordingly, the approach we take below is to consider the dynamical properties of a loaded tuning fork almost entirely in terms of the frequency mismatch between its tines whatever the source of Q-factor decrease. Deviations from eq. (1) can arise, however, if such energy loss channels as dissipation in the tines themselves, in the optical fiber or the fiber tip, or in fork/fiber contacts are competitive with dissipations due to vibration of the base. (In principle, even if the tines are loaded symmetrically so that $\Delta f=0$, Q-factor degradation can still occur due to an increase in the amplitude of base vibrations in the direction perpendicular to the motion of the tines, since tines are so designed as to minimize such vibrations in the unloaded fork.) However, if $\Delta f \neq 0$, this source of Q-factor degradation is, relatively, less important.

The change in the resonance frequency of a tuning fork's tine upon attaching an optical fiber is due both to the additional mass and the additional stiffness imparted to the tine by the fiber. Thus:

$$\frac{\Delta f}{f} = \frac{1}{2}\left(\frac{\Delta K}{K} - \frac{\Delta M}{M}\right). \qquad (2)$$

Here $\Delta K$ and $\Delta M$ are the changes in the effective force constant and the effective mass of the fiber which are assumed to be small. K and M are the effective force constant and mass of one of the tuning fork's tines. In the thin cantilever approximation, $K=\beta_n^4 EI/L^3$, where E is Young's modulus of the tine's material, I is the cross-sectional moment of inertia of the tine, L is its length, and $\beta_n$ is an eigenvalue corresponding to the nth vibrational mode of the cantilever (e.g. $\beta_1=1.875$).

II. The Shear-force Configuration

In the shear force mode, a fiber is normally glued along the edge of a tuning fork's tine. Hence, the deformation of the fiber can be viewed as pure bending, and $\Delta K \approx \beta_n^4 E_f I_f / L^3$, where $E_f$ is Young's modulus for the fiber material, and $I_f$ is the cross-sectional moment of inertia of the fiber given by $I_f=0.25w^2 S$, where w is the width of the tuning fork's tine and S is the fiber cross-section. Taking into account that for a rectangular tine of width w and height h, $I=\frac{1}{12} w^3 h$, $\Delta K/K=3E_f S/Ewh \approx 3\Delta M/M$ if one assumes the Young's moduli of the quartz tuning fork and the optical fiber to be approximately equal. Therefore, both the mass and the stiffness contributions to the tine frequency mismatch are of the same order of magnitude. The frequency mismatch of the two tines of the tuning fork is $\Delta f/f \approx \Delta M/M = 24$ for a 125 $\mu$m diameter optical fiber and the tuning forks used in our experiments. For a tuning fork with a resonance frequency of 32,768 Hz, the frequency shift is $\approx 700$ Hz. Q-factors in the range 1000–1700 have been reported for frequency shifts of this magnitude.[2,9] Thus in the shear-force configuration small frequency shifts ($\Delta f/f \ll 1$) and moderately large Q-factors can be obtained without any special modification of the optical fibers. As we demonstrate in the next section, this is not the case in the perpendicular mode.

III. The Perpendicular Mode Configuration

In the perpendicular mode, the fiber must ideally be oriented across the tines of the tuning fork and attached to one of the tines. (Alternatively, the fiber can be attached along a tine and the fiber tip bent. The drawback of that strategy was discussed above.) The fiber also has to be attached to a stationary support in order to decouple the guiding portion of the fiber from the tuning fork. In our design, this is achieved by placing the tuning fork in a holder and epoxy-gluing a portion of the fiber to the holder (see FIG. 1). In the course of attachment, the fiber inevitably sustains some degree of bending. Bending of the fiber can also be introduced deliberately. As we show below, the degree of fiber bending has a profound effect on fiber dynamics and on the magnitude of the Q-factors achieved in the perpendicular mode configuration.

Figure 3:
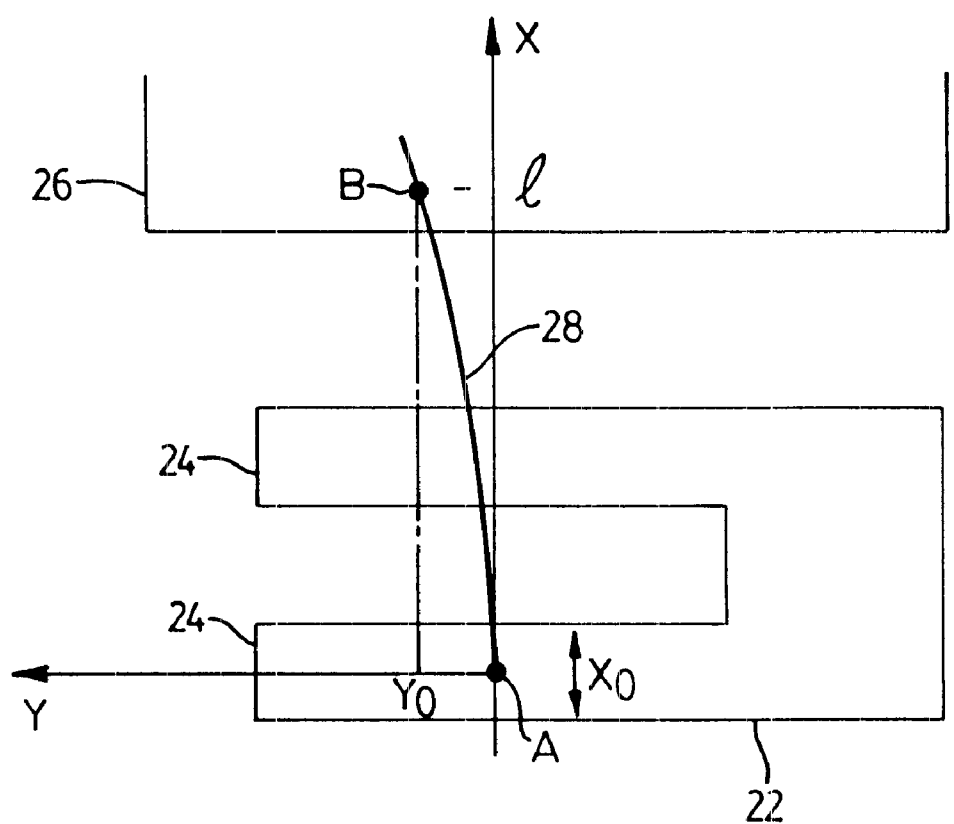
FIG. 3. Schematic of the mode of attachment of an optical fiber to a tuning fork for operation in the perpendicular mode. Points A and B correspond to the respective points in FIG. 1. The transverse displacement of point B relative to point A, $y_0$, is the sum of the displacements in and out of the plane of the fork. The vertical displacement, $x_0$, of point A is due to the vibration of the tuning fork.

FIG. 3 shows a schematic of the fiber's attachment to the tuning fork and defines the relevant geometrical parameters. The degree of fiber bending is characterized by the displacement $y_0$. This parameter is defined such that it takes into account the fiber bending both in and out of the plane of the tuning fork. Only the limit of small bending deformations of the fiber, i.e. $(y_0/l)^2 \ll 1$ will be considered. The deformation energy of the fiber in this limit is given by:[15]

$$V = \frac{1}{2} ES \int_0^l \varepsilon(x)^2 dx + \frac{1}{2} EI \int_0^l \left(\frac{d^2 y}{dx^2}\right)^2 dx. \tag{3}$$

Here E is Young's modulus of the material of the fiber, S is the fiber cross-section, I is its cross-sectional moment of inertia, and $\varepsilon(x)$ is the fiber strain. The first and the second terms represent the energies of longitudinal and bending deformations of the fiber respectively. The longitudinal deformation of the fiber arises from both stretching and bending. i.e. $\varepsilon(x) = du(x)/dx + \frac{1}{2}(dy(x)/dx)^2$, where $u(x)$ is the displacement of the point x of the fiber along the x axis (FIG. 3). Since no stretching force is applied to the fiber when it is attached to the tuning fork, we assume that $\varepsilon(x)=0$. We also assume that at point A the fiber is oriented perpendicular to the tine, as would ideally be the case for operation in a "pure" perpendicular mode. The shape of the fiber can then be found by variationally minimizing V with respect to y, i.e. by solving Euler equation $$\frac{d^4 y}{dx^4} = 0 \tag{4}$$

with boundary conditions $y(0)=0$, $dy/dx(0)=0$ and $y(l)=y_0$. The solution of (4) is:

$$y = y_0 \left(\frac{3}{2}\left(\frac{x}{l}\right)^2 - \frac{1}{2}\left(\frac{x}{l}\right)^3\right), \tag{5}$$

which is the well-known expression for the bending deformation of a thin cantilever beam under a force couple.[15]

We now consider the deformation of the fiber induced by vibrations of the tuning fork. Such a deformation results in both additional stretching, $u_1(x)$, and bending, $y_1(x)$, of the fiber, and a total strain: $\varepsilon(x) = du/dx + du_1/dx + \frac{1}{2}(dy/dx + dy_1/dx)^2$. The total bending deformation equals $y+y_1$. As a first approximation, one can assume that the vibration of the tine results in a displacement such that point A moves strictly along x, and negligibly along y. The boundary conditions at the lower end of the fiber when point A is at $x_0$, are: $u_1(0)=x_0$, $y_1(x_0)=-y(x_0)$, and $dy_1/dx(x_0)=dy/dx(x_0)$. The latter two conditions ensure that the lower end of the fiber remains on the x axis. Point B, remains stationary as the tuning fork vibrates, so that $u_1(l)=y_1(l)=dy_1/dx(l)=0$. Taking into account the condition $u+\frac{1}{2}(dy/dx)^2=0$, and minimizing V with respect to $u_1$ and $y_1$, one obtains the following Euler equations:

$$\frac{du_1}{dx} + \frac{dy}{dx}\frac{dy_1}{dx} + \frac{1}{2}\left(\frac{dy_1}{dx}\right)^2 = \varepsilon = const \tag{6}$$

$$\frac{d^4 y_1}{dx^4} - \frac{S\varepsilon}{I}\left(\frac{d^2 y}{dx^2} + \frac{d^2 y_1}{dx^2}\right) = 0. \tag{7}$$

Using the six boundary conditions above, these two equations can be easily solved assuming $x_0 \ll y_0$, i.e. $y_1$ small compared to y. The resulting expression for the fiber strain, $\varepsilon$, is:

$$\varepsilon = -\frac{x_0}{l}\frac{1}{1 + \frac{9}{2800}\frac{Sy_0^2}{I}} = -\frac{x_0}{l}\frac{1}{1 + \frac{9}{175}\left(\frac{y_o}{d}\right)^2}. \tag{8}$$

The right-hand part of Eq. 8 was obtained by explicitly expressing S and I as functions of the fiber diameter d. The resulting expressions for the bending and stretching/compression force constants of the fiber, obtained from Eq. (3), are:

$$K_b = \frac{9}{175}\frac{\pi E y_o^2}{l}\frac{1}{\left(1 + \frac{9}{175}\left(\frac{y_o}{d}\right)^2\right)^2} \tag{9}$$

$$K_{sc} = \frac{\pi E D^2}{l}\frac{1}{\left(1 + \frac{9}{175}\left(\frac{y_o}{d}\right)^2\right)^2}. \tag{10}$$

The force constants obtained from Eq. (3) have been multiplied by a factor of 4 in Eq. (9) and (10). This is due to the fact that the effective force constant of a fiber mounted at the end of a tuning fork's tine is 4 times its actual force constant (see Eq. (12) in the next section). It is obvious from these expressions that both the fiber diameter and the degree of bending of the fiber have profound effects on its dynamics. Before etching, the outer fiber diameter is 125 $\mu$m and $y_0 \leq 0.5$ mm, hence $9/175(y_0/d)^2 < 1$, so that $\Delta K \sim K_{sc} \sim E d^2/l$, as would be the case for a perfectly straight fiber. Hence $K/\Delta K \sim 0.1$. Such a high fiber stiffness renders the tuning fork/fiber assembly unusable as a sensing element. In order to lower $\Delta K$ and obtain reasonably high Q-factors in the perpendicular mode, one must either increase the bending of the fiber (i.e. increase $y_0$), or decrease its diameter. Since excessive bending can result in optical losses, the second approach is preferred. By decreasing the fiber diameter such that $9/175(y_0/d)^2 \gg 1$, fiber bending, as opposed to longitudinal stretching dominates the force constant $\Delta K$, i.e.:

$$\Delta K \sim K_b = 20\pi E d^4/l y_0^2 \tag{11}$$

For example, if the fiber diameter is decreased to 25 μm, f/Δf=2K/ΔK=52 (for I=3 mm and $y_0$=0.5 mm), which should result in a dramatic increase of the Q-factor compared to its value for a fiber with 125 μm outer diameter.

Figure 4:
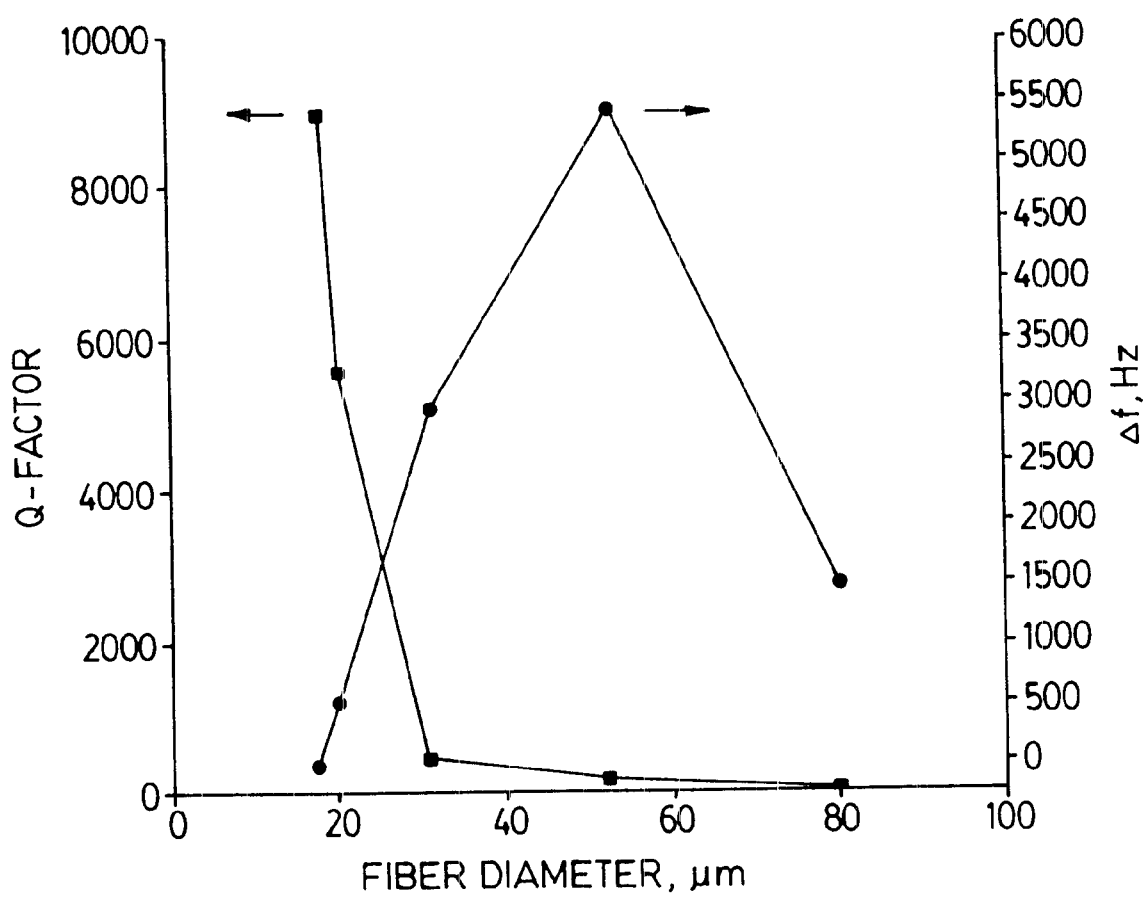
FIG. 4. The Q-factor (squares) and the tine frequency mismatch $\Delta f$(circles) of a tuning fork/optical fiber assembly measured as a function of the diameter of the thinned portion of the fiber. The tine frequency mismatch is assumed to be twice the shift of the resonance frequency of the fork upon loading. For a fiber diameter of 80 µm, the Q-factor is very small even though $\Delta f$ is lower than for fibers of smaller diameter. This is due to the decoupling of the vibrations of the two tines of the fork under the extreme loading of one of the tines.

Eq. (11) implies that ΔK and hence the Q-factor should be a very sensitive function of the diameter and the degree of bending of the fiber. The degree of bending is difficult to measure with adequate precision. However, we do observe that for a given fiber diameter the Q-factor can change by a factor of ten as $y_0$ is increased by appmximately 0.1 mm, in qualitative accord with Eq. (11). FIG. 4 shows the experimentaly measured dependence of Δf and the Q-factor of a tuning fork/optical fiber assembly on the diameter of the thinned portion of the fiber. For these measurements, the fiber 30 was prepared as described in the Experimental section and attached at a point near the middle of one of the tines 24 of tuning fork 22 (as in FIG. 1). The degree of banding of the fiber section 28 was maintained approximately constant for the various measurements, to the extent feasible. The Q-factor is very low for thicker fibers, but shows a sharp upturn when the fiber diameter is reduced to ~25 μm. This abrupt behavior is consistent with the expected $d^4$ dependence of the stiffness of the fiber on its diameter (Eq. 11), which should produce a $d^8$ dependence for Q on d. Because other effects also contribute to the reduction of Q, one does not expect the $d^8$ dependence to be obeyed quantitatively. Qualitatively, however, the measured results conform well with the analysis. For fibers with diameters reduced to 17 μm, we measured Q-factors of approximately 9000, i.e. approaching the Q-factor of the unloaded tuning fork ($Q_0$=15,000). Note that for the thinnest fibers (d=17 μm) Δf is negative, indicating that in this size range the resonance properties of the fork/fiber assembly are already determined by the mass of the epoxy glue rather than by characteristics of the fiber itself.

IV. Influence of the Point of Attachment of the Optical Fiber

In preparing a fiber/tuning fork assembly for use in the perpendicular mode, one can, in principle, attach the fiber at any point along a tuning fork's tine. However, the effective mass AM and effective stiffness ΔK of the fiber depend critically on the point of attachment. The functional form of this dependence ran be obtained quantitatively by considering the vibration of a "double span" cantilever beam with a point mass, m, and a lateral coil spring with a force constant, k, attached at a distance x from the cantilever base. The point mass and the spring represent the effects of the mass and the stiffness of the fiber. A detailed discussion of vibrational problems of this type can be found, for example, in [16]. For k and m small compared to the stiffness and the mass of the cantilever beam, the ratio between the effective and actual mass or stiffness is $$\frac{\Delta K}{k} = \frac{\Delta M}{m} \qquad (12)$$
$$= 2(\cosh\beta_n\mu\sin\beta_n\mu - \sinh\beta_n\mu\cos\beta_n\mu +$$
$$\sinh\beta_n\gamma\cos\beta_n\gamma - \cosh\beta_n\gamma\sin\beta_n\gamma +$$
$$\cosh\beta_n\mu\cosh\beta_n\gamma\sin\beta_n - \cos\beta_n\mu\cos\beta_n\gamma\sin\beta_n)/$$
$$(\cosh\beta_n\sin\beta_n - \sinh\beta_n\cos\beta_n).$$

Here μ=x/L, where x is the distance from the point of attachment of the fiber to the tine's base and L is the length of the tine, γ=1−μ, and $\beta_n$ are as specified for Eq. (2). For the first vibrational mode of a cantilever ($\beta_1$=1.875), ΔK/k and ΔM/m scale approximately as $\mu^3$. At the same time, the vibrational amplitude of the fiber tip, A, as a function of x can be obtained from the well known expression for free vibrations of a cantilever beam (the same expression also describes forced vibrations induced by a force applied at the end of the beam):

$$\frac{A}{A_0} = \frac{1}{2}((\sin\beta_n\mu - \sinh\beta_n\mu)(\cos\beta_n + \cosh\beta_n) - \qquad (13)$$
$$(\cos\beta_n\mu - \cosh\beta_n\mu)(\sin\beta_n + \sinh\beta_n))/$$
$$(\cosh\beta_n\sin\beta_n - \sinh\beta_n\cos\beta_n),$$

where $A_0$ is the vibrational amplitude of the end of the cantilever. For the first vibrational mode, the amplitude scales approximately as $\mu^{1.5}$. The sensitivity of an instrument is affected both by the Q-factor and the vibrational amplitude of the probe tip. Hence it is the product $QA^2$ that must be maximized in order to optimize the sensitivity.[11,13] If the Q-factor scales as $\Delta f^2$, as suggested by Eq. (1), the gain in the Q-factor resulting from the attachment of the fiber closer to the tuning fork's base outweighs the loss in vibrational amplitude, resulting in an overall increased sensitivity of the assembly. By taking into account Eqs. (1), (12) and (13) one can, in principle, predict the optimal point of attachment of the fiber which maximizes the quantity $QA^2$. However, we could not confirm the predictions of Eq. (12) experimentally. This is due, mainly, to the uncertainty in the degree of bending of the fiber, which is difficult to control precisely, but can have a profound effect on the Q-factor. In our final design of the sensing element for a perpendicular mode NSOM, we simply chose to attach the fiber at the middle of the tuning fork's tine. This results in a several-fold increase of the Q-factor compared to attaching the fiber near the end of the tine.

V. Influence of the Length of the Probe Tip on the Q-Factor

Figure 5:
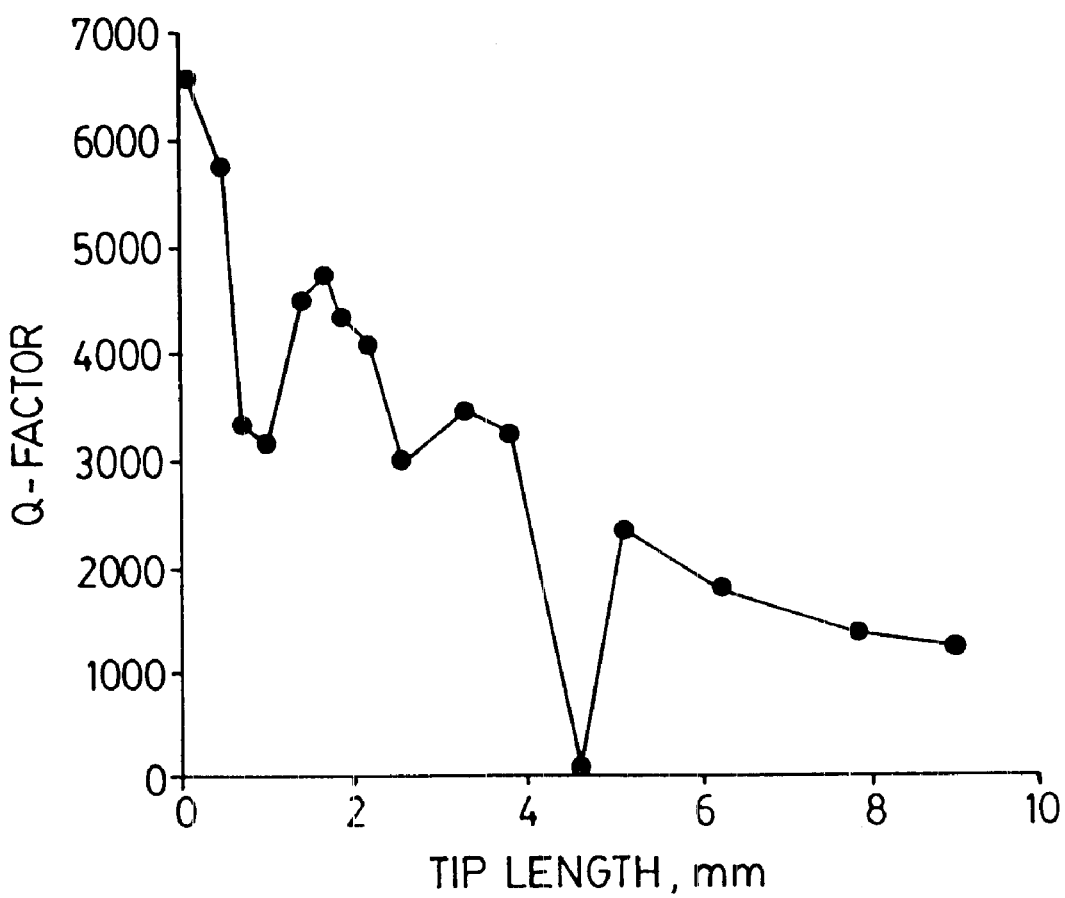
FIG. 5. The Q-factor of a tuning fork loaded with a 50 µm diameter tungsten tip as a function of the tip length.

Thus far we have only considered the change in the Q-factor of a loaded tuning fork due to the asymmetry of the tines and vibrational excitation of the fork's base. Other energy loss channels, such as the dissipation in the optical s fiber itself or in the tuning fork/fiber contacts, can also contribute to the degradation of the Q-factor. For example, we found that under certain circumstances the length of the probe tip can have a profound effect on the Q-factor of the assembly on top of the effect of the mass that it adds to the tine. Such tip-length effects were found to be less pronounced for optical fibers used as NSOM probes than for tungsten tips. FIG. 5 shows the Q-factors measured for a tuning fork with a 50 μm tungsten tip attached to one of its tines, as a function of the tip length. Based on the data shown in FIG. 2, one expects the Q-factor to decrease approximately quadratically with the tip length. The tip serves as a mass load, and the frequency mismatch between the fork's tines is expected to be proportional to the mass of the tip (and hence to its length. However, FIG. 5 indicates that the measured Q-factor dependence on tip length is a little more complicated. Superimposed on the quadratic function are three sharp drops in the Q-factor at tip lengths of ~1, 2.5 and 4.6 mm. The resonance frequencies $f_n$ of the nth transverse vibrational mode of a tip of diameter d and length L is given by the well-known expression:

$$f_n = \beta_n^2 dc/\beta\pi L^2 \qquad (14),$$

where the speed of sound, c=$(E/p)^{1/2}$=4300 m/s for tungsten, $\beta_1$=1.875, $\beta_2$=4.694 and $\beta_3$=7.855. Using this formula together with the known frequency of the tuning fork (33 kHz) and the tip diameter of the tungsten tip (50 μm), one calculates that the first, second and third resonances of tips of length 0.96, 2.4 and 4.0 mm Will have frequencies equal to 33 kHz. i.e. the resonance frequency of the fork. These numbers are in acceptable agreement with the tip lengths at which the Q-factor drops are observed. This suggests that the observed drops in the Q-factor at these tip lengths is due to the energy dissipation arising from the resonance excitation of transverse vibrations in the tip. These decreases in Q-factor can be quite dramatic (FIG. 5), despite the fact that the motions of the tuning fork and the tip are orthogonal to each other and are, therefore, expected to be uncoupled to first order. Other Q-factor losses were also observed. For example, bending the tip away from the direction perpendicular to the tuning fork's tine results in a 20–30% Q-factor decrease, likely due to the increased coupling between the vibrations of the tuning fork and the transverse vibrations of the bent tip.

Figure 6:
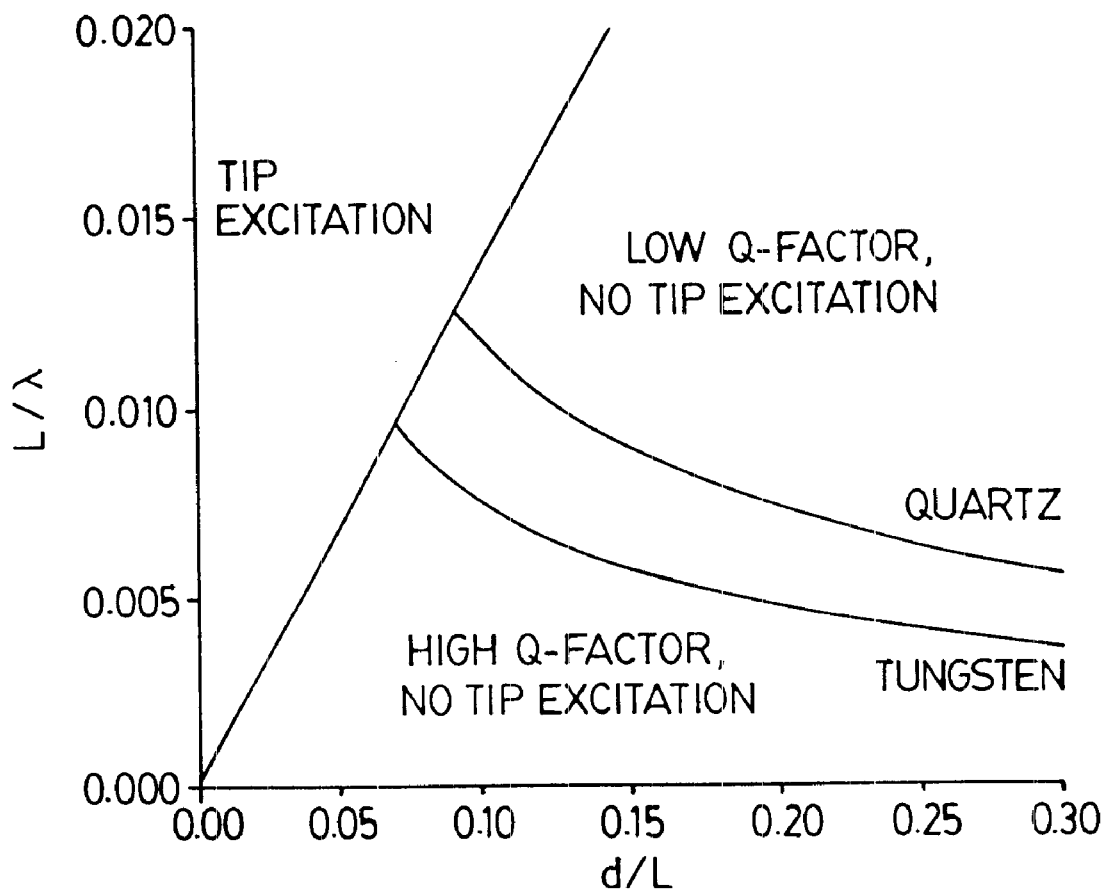
FIG. 6. A schematic diagram summarizing the range of tip size parameters resulting in optimal and nonoptimal operation of the tuning fork tip assembly. Here d is the diameter of the tip, L is its length, and $\lambda$ is the wavelength of sound at the tuning fork frequency propagating in the medium of which the tip is comprised.

The observations presented above are generalized in FIG. 6, where we plot the inverse aspect ratio of the tip, d/L, versus the dimensionless tip length, $L/\lambda$, where $\lambda=c/f$ is the wavelength of sound at the vibrational frequency of the tuning fork, propagating in the material of the tip. The straight line in FIG. 6 represents the condition imposed by eq. 14 for n=1. Because the line is plotted in terms of dimensionless variables it is a universal curve for all materials. For tips with d and L falling in the area below the straight line, no Q-factor deterioration due to vibrational excitation of the tip occurs, while in the area above the line such excitations are possible, hence the Q-factor might be degraded for tip parameters above the line. The Q-factor is also affected by the mass of the tip. The data plotted in FIG. 5 imply that the mass of the tip should not exceed 0.15 mg it a Q-factor in excess of 3000 is desired. The two hyperbolic curves in FIG. 6 represent this condition for tungsten and quartz. The Q-factor of a tuning fork/tip assembly exceeds 3000 if d and L of the tip lie below the corresponding curve. Thus the area in the diagram labeled "High Q-factor, no tip excitation" defines the desirable tip parameter range for high-Q operation. For tips with dimensions falling outside this area, the Q-factor is expected to be lower, either due to too large a tip mass, or non-optimal tip resonance conditions. The preferred tip size area for quartz is larger than for tungsten, due to its lower density and the higher speed of sound in quartz.

Causes for the deterioration of the Q-factor of NSOMs or AFMs using piezoelectric tuning forks as height control elements were analyzed and discussed, For NSOMs used in the "shear-force" mode of operation, the attachment of the optical fiber to the fork only moderately perturbs the force constant of the tuning fork's tine, because of the fiber's relatively low bending stiffness. Thus, even optical fiber tips with 125 $\mu$m outer diameters will not greatly reduce the Q-factor of piezoelectric tuning forks used in this fashion.

Contrariwise, for an NSOM based on a tuning-fork sensor configured in the perpendicular mode, the high stretching stiffness of the fiber results in a dramatic increase in the tine's force constant and a consequent dramatic lowering of the fork's Q-factor, in order to overcome this problem and achieve a reasonably high (>2000) Q-factor, one must reduce the outer diameter of the fiber below 25 $\mu$m. The fiber must also be slightly bent. These two modifications cause the vibrational dynamics of the resulting assembly to be dominated by the fiber's bending stiffness which, according to our analysis, is expected to depend on the fiber diameter, d, as $d_4$. A steep upturn was observed in the Q-factor of the tuning fork/optical fiber assembly as the fiber diameter was reduced below 25 $\mu$m, in accord with this prediction. Further substantial improvements in the Q-factor is achieved by attaching the fiber approximately midway between the fork's base and the tip of a tine. Such a strategy is expected to improve both the Q-factor and the force sensitivity of the microscope. (The latter depends both on the Q-factor and the vibrational amplitude of the probe tip.) Additionally, we determined that resonantly excited transverse tip vibrations also result in a significant Q-factor deterioration for certain tip lengths. Combining all of these insights we define the optimal parameter range for probe tips used either as NSOMs or AFMs using micro tuning forks as height sensing and regulating devices. By taking these insights into account we have successfully designed and built tuning fork/optical fiber assemblies with Q-factors up to 9000, and incorporated them into a perpendicular mode NSOM which utilizes the tuning fork both as the dithering and the sensing element.[12]

Figure 7:
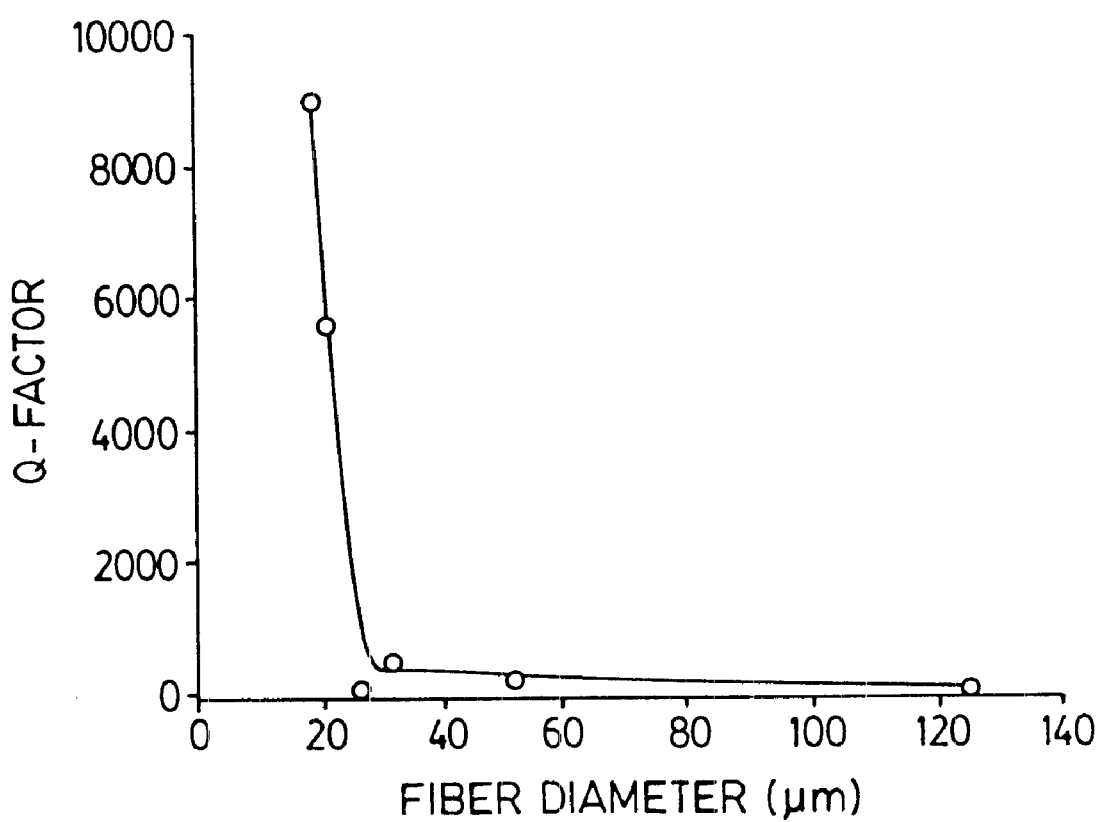
FIG. 7. The Q-factor of a tuning fork/optical fiber assembly measured as a function of the diameter of the thinned portion of the fiber. The degree of bending of the fiber was maintained approximately constant for all measurements. The solid line is a guide to the eye.

In accordance with the above discussion, the following steps were used to prepare a tuning fork/optical fiber assembly. First, the cladding of a 125 $\mu$M optical fiber (Newport Corp., F-SV, core diameter4 $\mu$m) is etched in 50% hydrofluoric acid to a diameter ~60 $\mu$m over a length ~1 cm. A sharp tip is then made by drawing the fiber while heating it in the plasma discharge of a commercial fiber splicer. The tip is covered with a protective layer of polymethylmethacrylate, and the fiber cladding is further etched down to 17–25 $\mu$m. The two-step etching sequence is necessary because 25 $\mu$m fibers are too thin to be conveniently handled using a fiber splicer. The protective layer on the fiber tip is then removed by dissolution in acetone. The fiber is epoxy-glued to a tine of a tuning fork near its middle. The other end of the thinned portion of the fiber is glued to the tuning fork holder (FIG. 1) specially designed with this configuration in mind. The measured Q-factors of a tuning fork/optical fiber assembly prepared in this way are shown in FIG. 7, as a function of the diameter of the thinned portion of the fiber. The Q-factors show a sharp upturn near a diameter of 25 $\mu$m. This abrupt behavior is qualitatively consistent with the sharp dependence of the stiffness of the fiber on diameter (Eq. 4). For fibers with diameters ~17 $\mu$m, the Q-factors were ~9000, approaching the Q-factor of an unloaded tuning fork ($Q_0$=15,000). Also, $\Delta f$ is negative, indicating that for such thin fibers the resonant properties of the fork are primarily determined by the is mass of the epoxy glue rather than by the elastic properties of the fiber.

Figure 8:
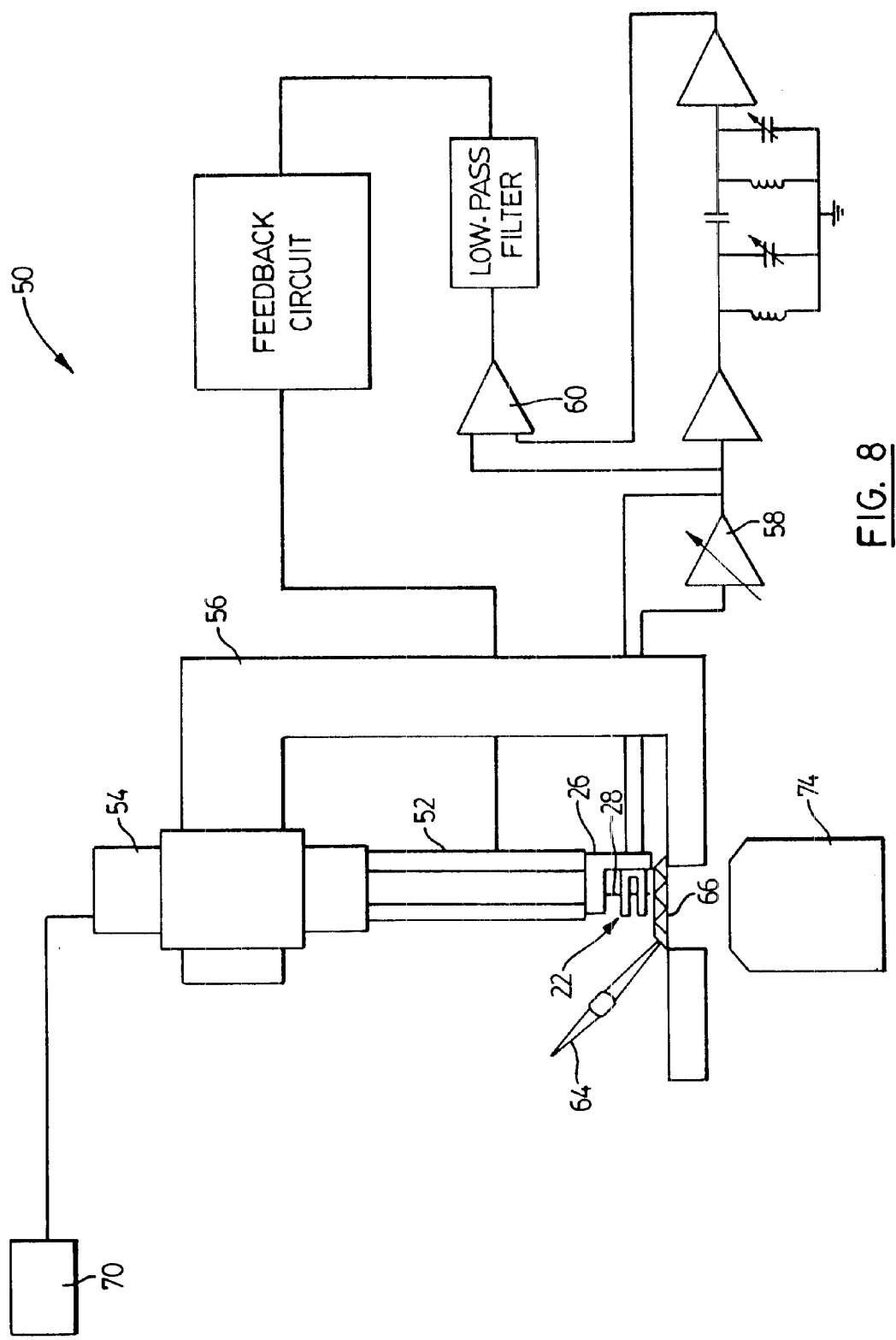
FIG. 8. A schematic diagram of the near field scanning optical microscope.

A schematic diagram of a perpendicular mode near-field scanning optical microscope 50 employing the tuning-fork/ optical fiber assembly described above is shown in FIG. 8. The holder 26 holding tuning fork 24 with fiber 30 attached thereto is glued to a piezoelectric scanning tube 52, which is, in turn, coaxially mounted in an inchworm linear motor 54 mounted in a support housing 56 used for coarse approach of the fiber tip 28 to the sample surface. The tuning fork 22, vibrating at its resonant frequency, acts as the frequency-setting element in a positive feedback loop. The variation of any of the three vibrational parameters of the tuning fork: amplitude, phase or frequency can, in principle, be used to control the tip-sample distance. We chose to use the change in frequency, as it allows for faster response times, which is especially important for systems with high Q-factors.[17] The signal from the tuning fork 22 is passed through a tunable two-pole LC-filter 58, which introduces a frequency-dependent phase shift, and through an analogue multiplier 60. The resulting signal, which is proportional to the change in the tuning fork's resonant frequency as the tip approaches the sample, is used as a feedback signal for regulating the tip-sample distance. The sensing element disclosed herein advantageously provides a vertical resolution of 1.5 Å for a tuning fork/optical fiber assembly with a Q-factor of 9,000.

The NSOM is operated in a photon scanning tunneling microscope (PSTM) mode. The sample is deposited on a piece of a Pyrex slide and then mounted on the surface of an attenuated total internal reflection prism using an index-matching fluid. An optical fiber/lens assembly 64 mounted on the sample stage is used to couple a laser beam into the ATR prism 66. The sample is excited by the evanescent field of the totally internally reflected light. The light emitted or scattered by the sample is collected by the sharpened optical fiber section 28 attached to the tuning fork 22 and detected with a photomultiplier 70 either directly or after passing through a spectrophotometer (not shown). The sample stage and the tuning fork assembly are mounted on top of an inverted microscope 74, allowing the far field image of the sample to be simultaneously collected.

Figure 9:
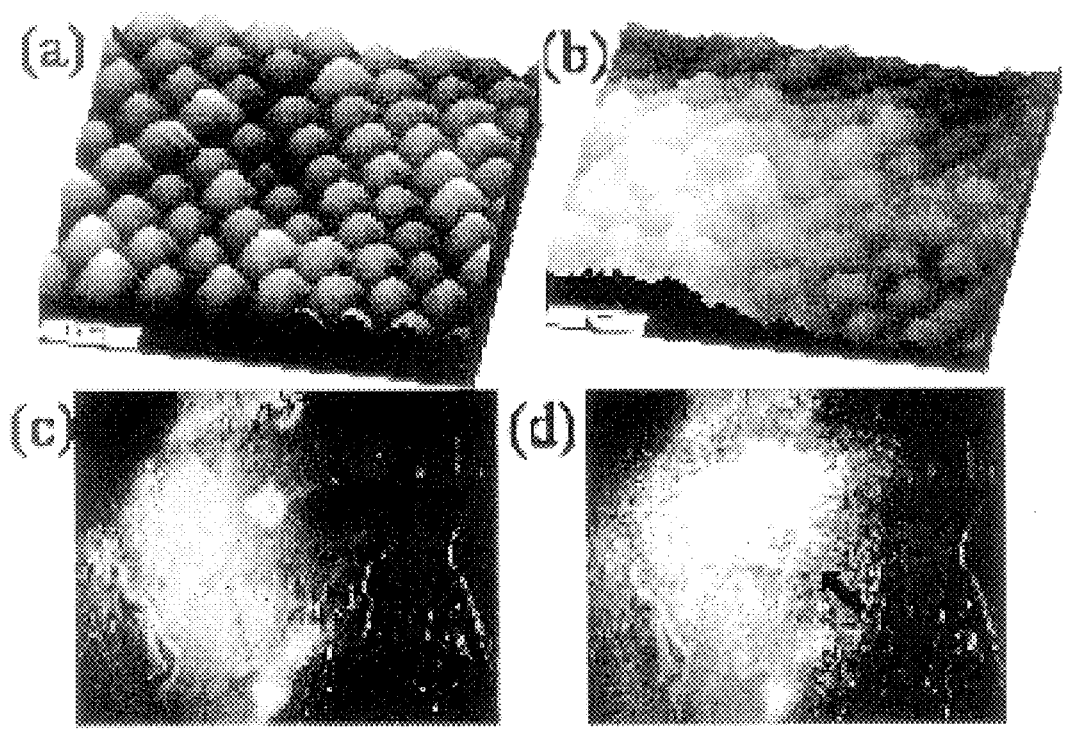
FIG. 9. Topographic (a) and optical (b) images of a closed-packed two-dimensional array of fluorescent 477 nm diameter polystyrene beads. The far field image of the sample obtained with an inverted microscope is shown in (c).

Typical topographic (AFM) and near- and far-field optical images of the surface of a trial sample are shown in FIG. 9. The sample consists of a closed-packed array of 477 nm polystyrene spheres doped with a fluorescent dye (Fluoresbrite, Polysciences Inc.). The fluorescence, which is excited with 514.5 nm light from an Ar-ion laser, is filtered using a long-pass filter with a 530 nm cutoff. Excellent resolution is obtained in the AFM image, both horizontally and vertically, allowing a clear imaging of interstices between spheres. In the optical image, the lateral resolution is not that good. This is due to the fact that the fiber tip was not metal-coated, hence the optical signal originates from several adjacent spheres.

Studies were carried out to determine the optical and mechanical properties and in particular the optical through-put of chemically thinned, metal-coated fiber tips used as Near Field Scanning Optical Microscopy (NSOM) probes. This approach has the two major advantages of allowing the NSOM tip to be dithered perpendicular to the sample surface while preserving the high quality factor of the tuning fork, The latter is very important to preserving a high NSOM sensitivity and signal-to-noise ratio. Incorporating the tuning fork in the Phase-Locked Loop circuit fully compensates for the scanning speed losses related to the high quality factors.

Figures 10A, 10B, 10C:
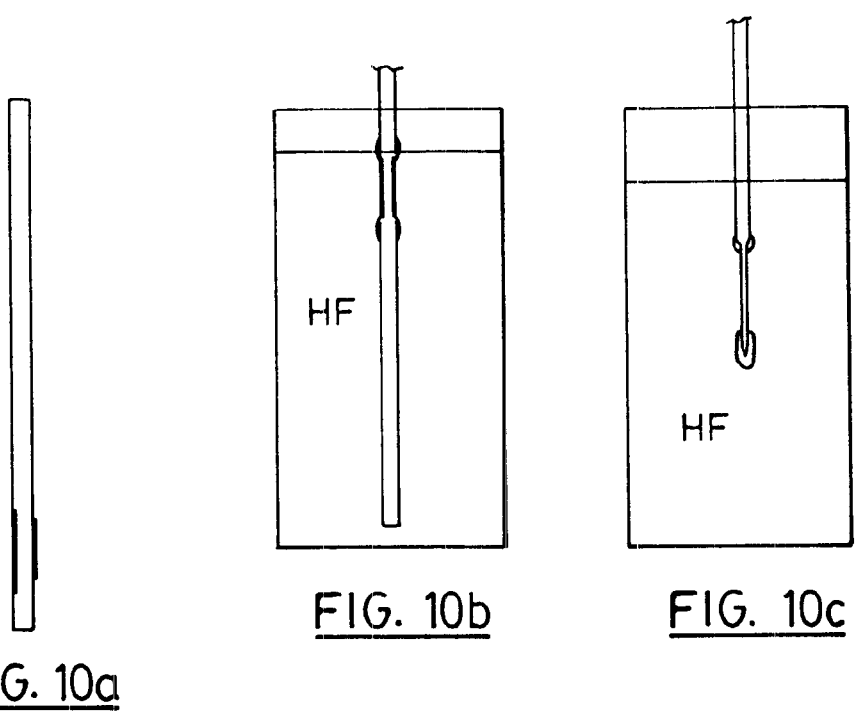
FIG. 10a to FIG. 10c. Fiber tip preparation procedure is shown.

Fiber tips were prepared by removing the plastic coating over a length of approximately 8 cm (3") from one end of the fiber (FIG. 10a) and etching the uncovered part in a 48% HF solution for 20 minutes (FIG. 10b). This process decreased the diameter of the fiber to ~60 μm. After etching, the fiber was placed in a commercial fusion splicer and a sharp tip was formed by applying a number of short arc-discharge pulses. The tip was then immersed into a drop of clear nail polish (this is essentially a solution of polymethylmethacry-late in acetone) to an approximate depth of 0.5 mm in order to protect the tip against additional etching by HF. The nail polish was allowed to dry for approximately 15 minutes and the fiber was again immersed into HF and etched for 14 minutes, reducing its thickness down to ~25 μm (FIG. 10c). The fiber was carefully washed in distilled water and acetone, sequentially, in order to completely remove residual HF and the nail polish from the tip. The sharpness of the tip was checked by high-resolution optical microscopy and placed into the metal-vapor deposition chamber.

Figure 11:
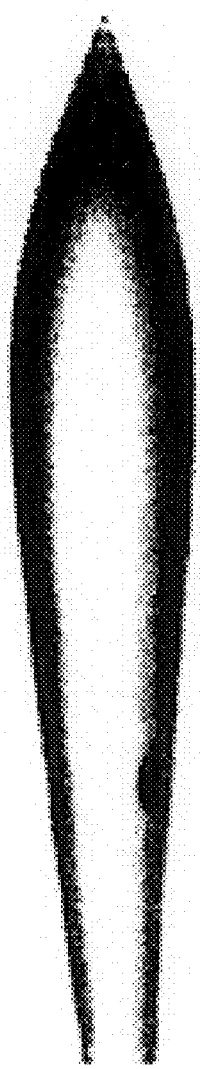
FIG. 11. Optical microscope and SEM images of the fiber tip prepared as illustrated in FIGS. 10a to 10c.
Figure 11:

A mechanical feedthrough allowed the fiber end to be rotated during metal deposition ensuring uniformity of metal coverage. The fiber end was oriented at an angle of ~45 degrees with respect to the metal vapor source during the metal-film deposition in order to minimize metal deposition on the very end of the tapered fiber tip. FIG. 11 shows an optical microscope image of the tip after depositing ~1 μm silver on the fiber.

VI Optical Throughput Measurements

Figure 12:
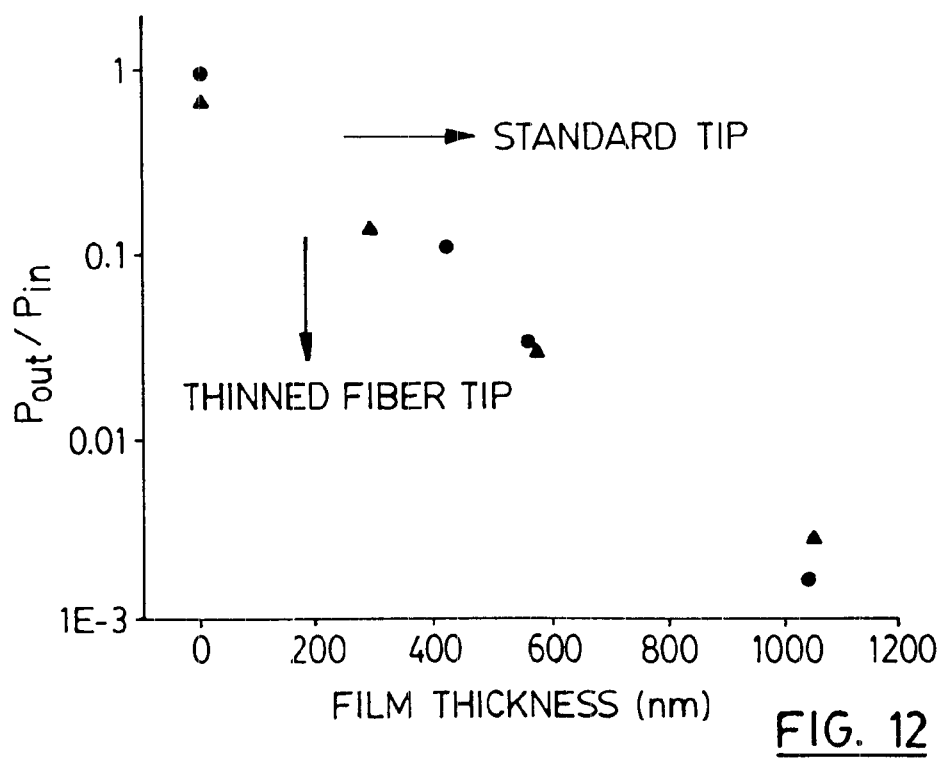
FIG. 12. Optical throughput as a function of the metal film thickness of the fiber tip prepared as illustrated in FIGS. 10a to 10c.

Two types of fiber tip constructions were used for the optical throughput measurements, the first (standard tip) was prepared by sharpening an un-thinned fiber with a diameter of 125 μm; the second (thinned tip) was a fiber first thinned to a diameter of ~25 μm using the procedure described above before sharpening. The optical throughput of the two fiber bps was measured by coupling a He—Ne laser beam to the unsharpened end of the fiber and measuring power of the output optical signal detected at the sharpened end of the fiber. FIG. 12 shows comparative results for the optical throughput as a function of metal-film thickness deposited on surface of the sharpened end of the tip. The measurements presented in FIG. 12 indicate that fiber thinning does not affect the optical throughput significantly.

Figure 13:
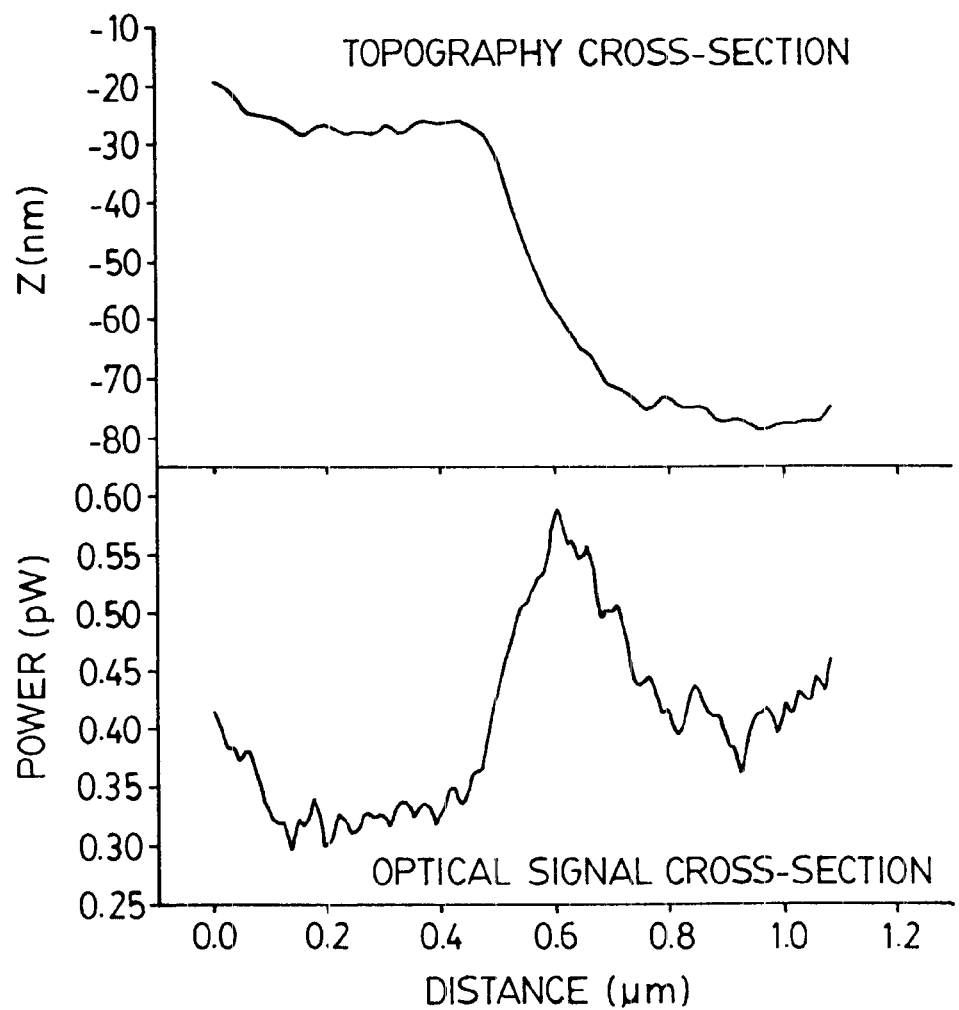
FIG. 13. Cross-sections taken from the upper left corner to the lower right corners of topographic and optical images taken with the fiber tip prepared according to FIGS. 10a to 10c.

NSOM and topographic images were acquired as follows. The etched and metal-coated fiber tip was glued to the tuning fork and topographic and near-field optical measurements carried out. Chopped laser light was coupled into a second fiber and focused to ~100 μm diameter spot on the sample under the tip. The power output of the illuminating fiber was in the range of 3–8 mW. A photomultiplier was used to measure the optical signal collected by the fiber tip. Tip-sample separation was controlled by incorporating the tuning fork in the Phase Lock Loop (PLL) of the electronics. The quality factor of the fork with attached optical fiber was measured to lie in the range of 3000–5000 both for the metalized and un-metalized fiber tips. This ensured very good sensitivity and a high signal-to-noise ratio. Representative experimental results were obtained for a replica optical grating. The cross-sections taken from the upper left corner to the lower right corners of topographic and optical images are shown in FIG. 13. The metal thickness used was 1 μm. The images were obtained with a tuning fork height-sensing feed-back operation and the fiber tip aligned so that it oscillates perpendicularly to the surface being imaged.

The results clearly demonstrate thinning a portion of the optical fiber near the sharpened fiber tips down to a diameter ~25 μm produces NSOM tips of high resonance quality even when used in a perpendicular vibratory fashion to obtain topographic images. High sensitivity and signal-to-noise is thereby achieved when using a tuning-fork element in the phase-lock loop. Thinning the fiber in the above-mentioned fashion does not significantly affect the optical throughput of the overall fiber probe. Metalizing the tip with silver to a thickness of ~1 μm does not reduce the Q-factor and hence the quality of operation as both a topographic imaging instrument and an NSOM imaging device.

Thinned and coated fiber tips can also be used in a shear-force mode of operation (i.e. with the tip oscillating tangentially to the surface being imaged) by gluing the fiber along (as opposed to across) one of the tines of the fork. When operated in this manner the fiber need only be thinned to ~50 μm for high quality factors i.e. Q~2000–2500 to be achieved. Quality factors of this magnitude are high enough to ensure stable PLL operation.

In summary, the present invention provides a perpendicular mode NSOM, which uses a quartz micro tuning fork as a height sensing element. High Q-factors of the tuning fork/optical fiber assembly are achieved by chemically etching the fiber to final diameters in the range of 17–25 μm. A sharp upturn in the Q-factor is observed when the fiber diameter, d, drops below 25 μm, in accord with the predicted $d^4$ dependence of the stiffness of a slightly bent fiber on diameter. The high Q-factors result in improved force sensitivity and allow to construct a perpendicular mode instrument without the use of additional dithering piezoelements.

In order to further increase the Q-factor and improve sensitivity and stability, the position of the tuning fork was raised approximately 0.1 mm in its mount after the thinned fiber was glued both to the holder (the mount) and to one fine of the fork. This procedure produced a slight arc in the portion of the fiber situated between the two glue points thereby releasing slightly the fiber tension and introducing additional fiber bending, shown in broken lines in FIG. 1, dramatically increasing the Q-factor from the range 1500–2000 to the range 5000–7000.

Figure 14:
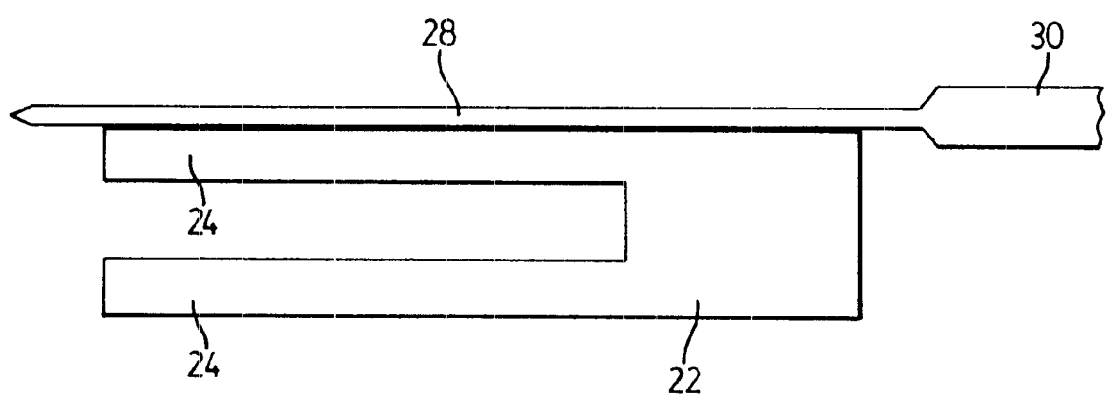
FIG. 14. A detailed view of the thinned optical fiber assembled with a micro tuning fork to be used as a sensing element for an NSOM in the shear force mode.

Thinning the fiber diameter by etching down to 50.60 μm also improves NSOM performance even when the NSOM is operated in the shear force mode as shown in FIG. 14. Hence this claim (thinning the fiber below a critical diameter) is not restricted to NSOMs operated in the perpendicular mode. Typical Q-factor values for unetched 125 μm fiber are in the range 500–1000. Etching the fiber down to 50–60 μm was very surprisingly found to increase the Q-factor to values as high as 3000, which increases the sensitivity of the shear force distance control when phase-locked feedback loop (PLL) is used.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

REFERENCES

[1] E. Betzig, P. L. Finn, and J. S. Weiner, Appl. Phys. Lett., 60, 2484 1992).

[2] K. Karrai and R. D. Grober, Appl. Phys. Lett., 68, 1842 (1995).

[3] W. A. Atia and C. C. Davis, Appl. Phys. Lett., 70, 405 (1997).

[4] Y.-H. Chuang, C.-J. Wang, J. Y. Huang, and C.-L. Pan, Appl. Phys. Let., 69, 3312 (1996)

[5] H. Edwards, L. Taylor, W. Duncan, and A. J. Melmed, J. Appl. Phys., 82, 980 (1997).

[6] A. G. T. Ruiter, J. A. Veerman, K. O. van der Werf, and N. F. van Hulst Appl. Phys. Lett., 71, 28 (1997).

[7] H. Muramatsu, N. Yamamoto, T. Umemoto, K. Homma, N. Chiba, and M. Fujihira, Jpn. J. Appl. Phys. 1, 36, 5753 (1997).

[8] J. Salvi, P. Chevassus, A. Mouflard, S. Davy, M. Spajer, D. Courjon, K. Hjort, and L. Rosengren, Rev. Sci. Instrum., 69, 1744 (1998).

[9] A. G. T. Rulter, K. O. van der Werf, J. A. Veerman, M, F. Garcia-Parajo, W. H. L. Rensen, and N. F. van Hulst, Ultramicroscopy, 71, 149 (1998).

[10] D. P. Tsai and Y. Y. Lu, Appl. Phys. Lett., 73, 2724 (1998).

[11] Y. Martin, C. C. Williams, and H. K. Wickramashinghe, J. Appl. Phys., 61, 4723 (1987).

[12] D. N. Davydov. K. B. Shelimov, T. L. Haslett, and M. Moskovits, Appl. Phys. Lett., submitted.

[13] T. R. Albrecht, P. Gruftter, D. Horne, and D. Rugar, J. Appl. Phys., 69, 668 (1991).

[14] Y. Tomikawa, K. Sato, M. Konno, and R. A. Johnson, IEEE Trans. Sonics Ultrason., SU-27, 253 (1980).

[15] See, for example, S. P. Timoshenko and J. N. Goodier, "Theory of Elasticity", McGraw-Hill, NY, 1970.

[16] D. J. Gorman. "Free vibration analysis of beams and shafts", John Wiley & Sons, NY, 1975.

[17] T. R. Albrecht, P. Grütter, D. Horne, and D. Rugar, J. Appl. Phys., 69, 668 (1991).

Therefore what is claimed is:

1. A piezoelectric sensing element for use in a near-field scanning optical microscope, comprising:

a micro tuning fork mounted in a holder, the micro tuning fork including first and second tines and the holder having a piezoelectric element for dithering the micro tuning fork; and an optical fiber being connectable to a photodetection means and having a thinned end portion having a diameter less than a threshold thickness, the thinned portion of the optical fiber being attached at a first position thereof to the holder and attached at a second position thereof spaced from an end of the optical fiber to said first tine at a position spaced from an end of the first tine, the optical fiber extending transversly across the first and second tines of the micro tuning fork, said first tine being adapted to be adjacent to a surface being scanned.

2. The sensing element according to claim 1 wherein said thinned portion of the optical fiber has a thickness in a range from about 17 μm to about 25 μm.

3. The sensing element according to claim 2 wherein the second position of the thinned portion of the optical fiber is attached approximately midway along the length of the first tine.

4. The sensing element according to claim 1 wherein the thinned portion of the optical fiber has an arc in the portion between the first and second positions so that the optical fiber is not under tension between the first and second positions.

5. The sensing element according to claim 1 wherein said thinned portion of the optical fiber is attached along a length of one of said tines.

6. The sensing element according to claim 5 wherein said thinned portion of the optical fiber has a thickness in a range from about 40 μm to about 70 μm.

7. The sensing element according to claim 5 wherein said thinned portion of the optical fiber has a thickness in a range from about 50 μm to about 60 μm.

8. The sensing element according to claim 2 wherein said thinned portion of the optical fiber terminates in a sharpened tip and including a metal coating on said thinned fiber portion.

9. A piezoelectric sensing element for use in a near-field scanning optical microscope, comprising:

a micro tuning fork mounted in a holder, the micro tuning fork including first and second tines and the holder having a piezoelectric element for dithering the micro tuning fork; and an optical fiber being connectable to a photodetection means and a thinned end portion having a diameter less than a threshold thickness, the thinned portion of the optical fiber being attached at a first position thereof to the holder and being attached at a second position thereof spaced from an end of the optical fiber to a first tine at a position spaced from an end of the first tine, the optical fiber extending transversly across the tines of the micro tuning fork, said first tine being adapted to be adjacent to a surface being scanned in operation.

10. The sensing element according to claim 9 wherein said thinned portion of the optical fiber has a thickness in a range from about 17 μm to about 25 μm.

11. The sensing element according to claim 9 wherein the second position of the thinned portion of the optical fiber is attached approximately midway along the length of the first tine.

12. The sensing element according to claim 11 wherein the thinned portion of the optical fiber has an arc in the portion between the first and second attachment positions so that the optical fiber is not under tension between the first and second positions.

13. The sensing element according to claim 9 wherein said thinned portion of the optical fiber terminates in a sharpened tip and including a metal coating on said thinned fiber portion.

14. The sensing element according to claim 13 wherein said diameter is in a range of about 50 to about 60 µm.

* * * * *